July 9, 1974 R. COLOMBO 3,823,211
SYNTHETIC RESIN LAMINATE AND ITS MANUFACTURING PROCESS
Filed Dec. 13, 1971 2 Sheets-Sheet 1

United States Patent Office 3,823,211
Patented July 9, 1974

3,823,211
SYNTHETIC RESIN LAMINATE AND ITS MANUFACTURING PROCESS
Roberto Colombo, Turin, Italy, assignor to Lavorazione Materie Plastiche L.M.P. S.p.A., Turin, Italy
Filed Dec. 13, 1971, Ser. No. 207,118
Claims priority, application Italy, Jan. 12, 1971, 67,093/71
Int. Cl. B29c 5/08, 5/10
U.S. Cl. 264—47                 11 Claims

ABSTRACT OF THE DISCLOSURE

A synthetic resin laminate comprising a layer of synthetic foam heat-sealed to a biaxially stretched covering film of synthetic resin. The manufacturing process comprises simultaneously coaxially extruding a tubular film extrudate and a tubular foam extrudate not contacting each other, the film extrudate being external to the foam extrudate, and axially drawing and diametrically differentially expanding the extrudate while in heat-softened state until the foam extrudate laminates on the inside of the film extrudate.

---

This invention relates to synthetic resin laminates which are extremely light and at the same time of excellent mechanical resistance, thermal insulation and insensitivity to numerous chemical agents, so as to suit them for numerous technical applications in which said qualities are of fundamental importance, such as for example in the packaging field.

The invention also relates to a process for the continuous production of said laminates.

The laminate according to the invention is characterised essentially in that it comprises a layer of synthetic foam heat-sealed without solvents or adhesives to a biaxially stretched covering film of synthetic resin. Preferably the covering film is applied to both faces of the foam layer. The foam layer is preferably of foamed polystyrene, whereas the covering film is preferably of high-impact polystyrene or ABS resin, the term "high-impact polystyrene" being here used in the widest sense, including the various copolymers, interpolymers, graft copolymers, mixtures and other compositions obtained prevalently from monomers or polymers of styrene and having that impact resistance which is lacking in ordinary polystyrene.

The laminates according to the invention may be flat, corrugated, embossed, intaglio printed on one or both faces, or have score lines impressed therein according to a design corresponding to the box or case to be obtained.

The process according to the invention is mainly characterised in that the components of the laminate are simultaneously and coaxially extruded in tubular form, the film extrudate being external to the foam extrudate, and the extrudates are axially drawn and diametrically differentially expanded while in heat softened state so that the synthetic foam tubular extrudate laminates from the inside into the film extrudate.

The synthetic foam extrudate can be diametrically expanded by fluid pressure or by causing it to travel on a solid expander or else by a combination of fluid pressure and solid expander. The film extrudate can be diametrically expanded by fluid pressure and/or by the expansion of the foam extrudate. Advantageously, when the film extrudate is expanded with the aid of fluid pressure, the fluid pressure and the progress of expansion of the foam extrudate are mutually adjusted in such a manner that lamination of the extrudates takes place only after each of the extrudates has been expanded independently of the other to at least 90% of their maximum diameter of expansion. In a preferred embodiment, a bubble form is conferred to the two extrudates by progressive flattening and pinching, this latter being carried out in such a manner as to seal the foam layer on itself while heat is supplied to the inside of the bubble to maintain the foam layer in a state sufficiently softened for sealing.

Figure 6:
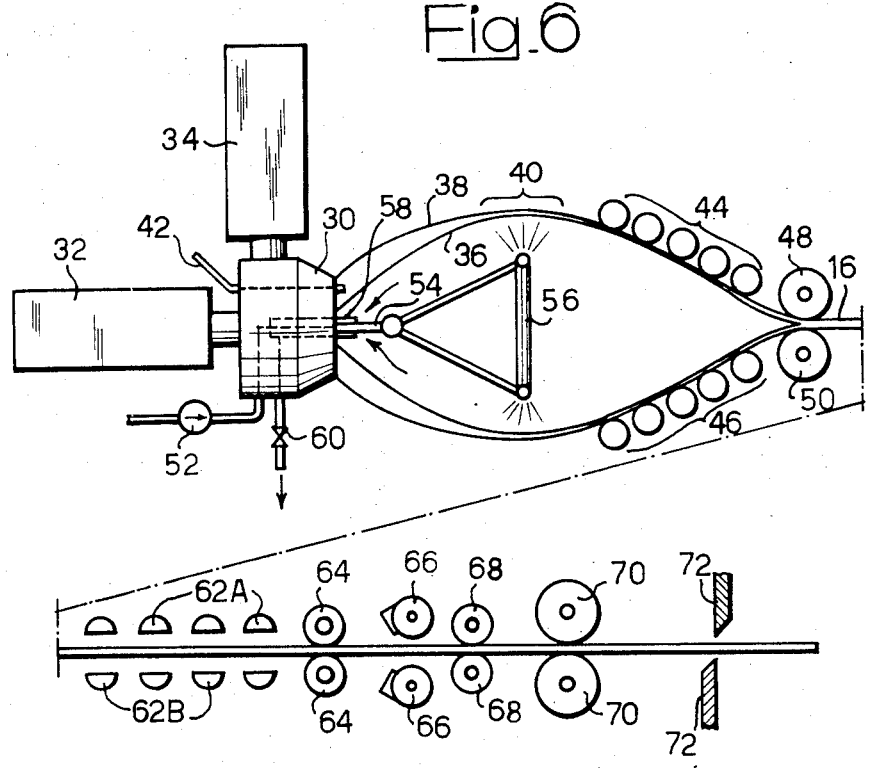
Figure 7:
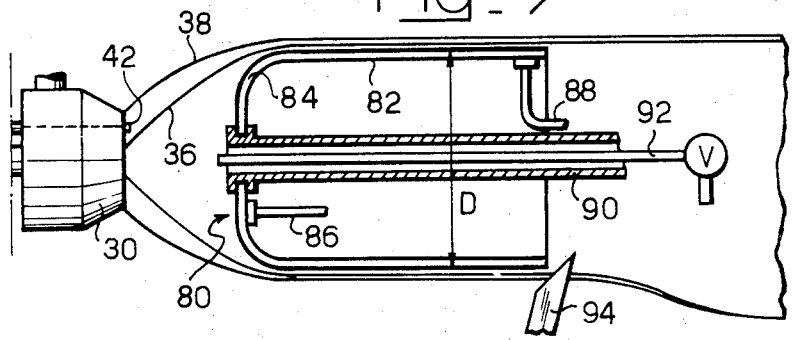

Some embodiments of the laminate according to the invention are illustrated in enlarged cross-sectional view in FIGS. 1–5 of the accompanying drawings, whereas FIGS. 6 and 7 illustrate two embodiments of the relative manufacturing process.

Figure 1:
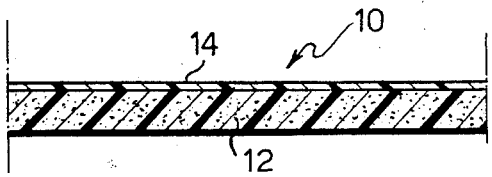
Figure 2:
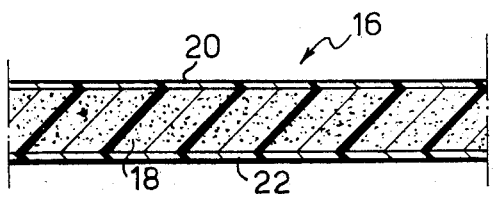

The laminate 10 in FIG. 1 is flat and consists of a layer 12 of foamed polystyrene, to one face of which a film 14 of biaxially stretched high-impact polystyrene or ABS resin is heat-sealed. The thickness of the layer 12 is typically in the order of a few millimetres, whereas the thickness of the film 14 is typically in the order of some hundredths of a millimetre. In FIG. 2 the laminate 16 consists of a layer 18 of foamed polystyrene, having heat-sealed to both its faces biaxially stretched films 20, 22 of high impact polystyrene or ABS resin.

Figure 3:
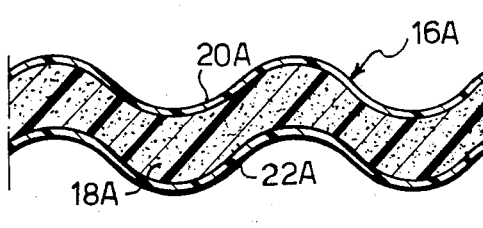
Figure 4:
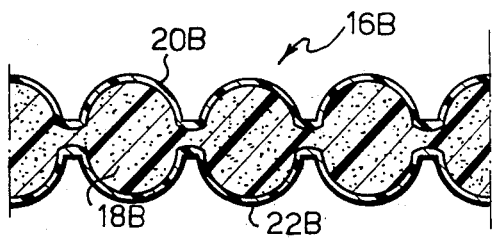
Figure 5:
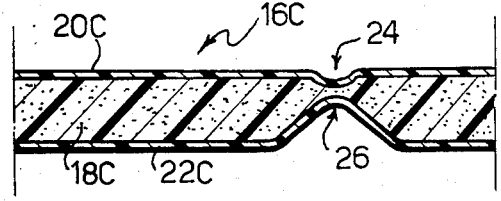

FIG. 3 illustrates a laminate 16A similar to the laminate 16 of FIG. 2, but which has been given a corrugated form during manufacture. The laminate 16B is still similar to that of FIG. 2, but has been embossed to a ribbed shape. Finally, in the laminate 16C of FIG. 5, score lines 24, 26 have been impressed, which may extend longitudinally (as illustrated) and/or transversely in conformity with the folding pattern necessary for the formation of a box or case.

In FIG. 6, an extrusion head 30 is simultaneously fed from an extruder 32 for synthetic foam and an extruder 34 for tubular film. The head 30 comprises a first circular nozzle, from which a tubular extrudate 36 of synthetic foam (for example expanded polystyrene) emerges and is enlarged in the form of a bubble of compressed air. The head 30 further comprises a second circular nozzle, externally concentric with the first, from which emerges a tubular film extrudate 38 (for example of high-impact polystyrene), also enlarged in the form of a bubble by compressed air or by the first bubble. Preferably, the inflation pressure of the film bubble 38 is adjusted so as to produce the desired degree of stretch of the tubular film, whereas the inflation pressure of the foam bubble 36 is adjusted so as to bring about the joining of this bubble to the bubble 38 starting from a certain point on their path, preferably starting from the zone 40 corresponding to the maximum diameter of the two bubbles. The pressure inside the film bubble 38 is maintained by means of an air feed duct 42, with its outlet in the annular interspace between the two extrusion nozzles.

The pressure inside the foam bubble 36 is maintained by means of a system which will be described hereinafter.

Starting from the zone 40 the two materials form a single tubular laminate bubble which is progressively flattened by passage between two series of rollers 44, 46, which accompany it as far as a pair of pinch rollers 48, 50, whose purpose is not only to block the compressed air in the foam bubble 36, but also to seal the two opposing layers of foam one to the other so as to obtain a laminate of the type shown in FIG. 2. To this end, on the one hand the pinch pressure exerted by the rollers 48, 50 must be sufficient to produce said sealing, whereas on the other hand the foam bubble must be maintained at a sufficiently high temperature to make sealing possible. In the embodiment shown in FIG. 6, the heat necessary for this purpose is provided by the same compressed air which serves for inflating the foam bubble 36. More precisely, the air at elevated temperature is fed to the bubble 36 by a compressor 52 through a duct disposed on the axis of the head and an annular header 56 disposed preferably in a position corresponding with the zone 40, said header being provided with a plurality of nozzles directed against the zone 40. A part of the air contained in the bubble 36 passes into a duct 58 (surrounding the duct 54 coaxially) and is discharged through a pressure relief valve 60. In this manner by adjusting the temperature of the feed air and the valve 60, a circulation is set up inside the bubble 36 of hot air under pressure, which maintains the bubble 36 at the desired pressure and temperature. It is however evident that the system illustrated may be substituted by a double circuit comprising means for feeding hot air independent of the means for feeding the inflating air. In either case the foam bubble 36 is "contained" by the film bubble 38 in the path between the zone 40 of the first contact and the pinch rollers 48, 50. These latter are preferably maintained at a relatively elevated temperature (by means of internal circulation of hot fluid), which is lower than the extrusion temperature of the tubular film 38, but sufficient to avoid undue cooling of the thermoplastic material in the pinch-sealing zone. The pinch rollers 48, 50 are driven at a circumferential speed such as to longitudinally stretch the tubular extrudates 36, 38 in the bubble region to a desired degree in addition to the transverse stretch produced by compressed air.

After the momentary compression between the rollers 48, 50, the flat laminate 16 just formed tends to swell out, i.e. to reassume the total thickness of the layers from which it has been formed. It is preferable to stimulate this swelling out by means of heating. To this end, FIG. 6 shows banks of heaters 62A, 62B, disposed immediately downstream of the pinch rollers 48, 50, and situated in front of the opposing faces of the laminate; and may comprise infra-red radiators, hot air jets or other means adapted to favour the expansion of the gas in the cells of the foam layer.

In this manner the laminate 16 assumes a thickness distinctly greater than the sum of the thicknesses measured diametrically in the zone 40 and is still in a sufficiently plastic state for pressing or deforming by a pair of embossing rollers 64. The rollers 64 are preferably internally cooled and are driven at the speed of the laminate and reciprocally synchronized, and comprise surfaces profiled in conformity with the impression or deformations to be produced, e.g. for obtaining the laminates illustrated in FIGS. 3–5. On leaving the rollers 64 the laminate is immediately thoroughly cooled by means of a pair of fans 66 and passes between a set of circular knives 68 which trim the two longitudinal edges of the laminate and cut it where appropriate into strips of the desired width.

The trailing rollers for the laminate are indicated by the reference numeral 70, and are followed by a pair of knives 72 for transversal cutting.

In the embodiment shown in FIG. 7, the parts corresponding to those already described with reference to FIG. 6 are indicated by the reference numerals 30, 36, 38 and 42. Lamination of the two tubular extrudates 36, 38 is in this case carried out with the assistance of an expander 80, situated in front of the extrusion head 30 and coaxial with it. The expander comprises a double-walled bell-member 82, whose cooling jacket is indicated by the reference numeral 84 and which is cooled by means of circulation of water through the connections 86, 88. The bell-member 82 is supported by a tubular shaft 90 open towards the extrusion head 30, through which compressed air is fed for expanding the tubular foam extrudate 36 in opposition to the pressure of the air (if any) fed by the duct 42 for expanding the firm extrudate 38. For precision adjustment of the pressure of air in the tubular foam extrudate 6 a breather pipe 92 is disposed coaxially in the shaft 90, and a pressure relief valve V is disposed at its rear extremity calibrated for the desired pressure. Preferably, by adjusting the two expansion pressures, sealing of the two tubular extrudates is made to take place only when both extrudates have been pneumatically expanded at least to 90–95% of the diameter D, so that the stretching undergone by the two extrudates during expansion takes place independently one from the other, analogously with that which takes place under the conditions described with reference to FIG. 6. Thus after joining, the two components 36, 38 undergo only a minimum stretch addition in common, as necessary for gaining the nominal diameter D.

Immediately downstream of the expander is fixed a slitting knife 94, which slits the tubular laminate along a generatrix (according to known techniques), so allowing it to be opened and processed in the manner substantially similar to that described hereinbefore with reference to the parts 62A through 72 in FIG. 6 to obtain a laminate of the type shown in FIG. 1.

EXAMPLE 1

An apparatus as shown in FIG. 6 is used to produce a laminate of the type shown in FIG. 2.

The tubular foam extrudate 36 is extruded at 130° C. from an annular nozzle 100 mm. in diameter and 0.8 mm. in radial width; the nozzle is fed with 100 kg./hr. molten polystyrene containing 6 wt. percent "Freon 11–12" (R.T.M.) as foaming agent.

The film extrudate 38 is extruded at 170° C. from an annular nozzle 150 mm. in diameter and 0.5 mm. radial width; the nozzle is fed with 50 kg./hr. molten high-impact polystyrene composition. The foam extrudate is blown to bubble form by air at a pressure of 0.3 kg./cm.$^2$ and a temperature of about 80° C. The conduit 42 is connected to a source of compressed air at 0.05 kg./cm.$^2$. The maximum diameter of the bubble is 70 cm. and the two tubular extrudates laminate on each other within the region of said maximum diameter. The circumferential speed of the pinch rollers 48, 50 is 30 m./min.; the rollers are kept at room temperature. Also the circumferential speed of trailing rollers 70 is 30 m./min. Infrared radiators 62, 62B are used to heat the laminate 16 at about 100° C. The thickness of the foam layer (18 in FIG. 2) is thus substantially doubled; that is to say that the density of the foam layer, which was about 0.1 before heating, becomes now about 0.06. After cooling and severing, sheets of a laminate of the type shown in FIG. 2 are obtained, in which the thickness of the layer 18 amounts to 1.7 mm.

EXAMPLE 2

Example 1 is repeated, with the difference that the pressure in the bubble formed by the foam extrudate is 0.25 kg./cm.$^2$ and the conduit 42 freely opens to the outer atmosphere instead of being connected to a pressure air source. Thus, the tubular film 38 is expanded by the bubble formed by the foam extrudate 36. A laminate substantially similar to that of Example 1 is obtained, in which, however, the density of the foam layer 18 is 0.05.

EXAMPLE 3

An apparatus of the type shown in FIG. 7 is used, to obtain a laminate of the type shown in FIG. 1. The extrusion head is identical to that employed in Example 1.

The tubular extrudates 36, 38 are extruded at a rate of 80 kg./hr. and 40 kg./hr., respectively. The trailing speed of the laminate is 15 m./min. The diameter D of the bell member 80 is 33 cm.; the bell member is cooled by circulation of water so adjusted that the temperature of the laminate leaving the bell member is between 40° and 50° C. The conduit 42 is connected to free atmosphere. In the conical space at the inside of the foam extrudate 36 an air pressure of 0.05 kg./cm.$^2$ is maintained by means of conduits 90, 92 and valve V. A laminate of the type shown in FIG. 1 is obtained, wherein the film 14 of high-impact polystyrene is 0.45 mm. thick and the foamed layer 12 is 1.8 mm. thick and has a density of 0.05.

What I claim is:

1. A process for the manufacture of a plastic laminate comprising a layer of synthetic foam sealed to a covering film of synthetic resin, comprising simultaneously and coaxially extruding said foam and resin components into tubular form, the film extrudate being external to the foam extrudate and one component not being in contact with the other; independently axially drawing and diametrically differentially expanding said extrudates while in heat-softened state; and then bringing the foam into contact with the resin while continuing said drawing and expanding so that the synthetic foam tubular extrudate laminates from the inside onto the film extrudate.

2. Process as claimed in claim 1, characterised in that following independent drawing and expanding, the film extrudate is diametrically expanded by diametrical expansion of the synthetic foam extrudate.

3. Process as claimed in claim 2, wherein the synthetic foam extrudate is diametrically expanded by fluid pressure.

4. Process as claimed in claim 2, wherein the synthetic foam extrudate is diametrically expanded by causing it to travel on a solid expander.

5. Process as claimed in claim 1, characterised in that both tubular extrudates are diametrically expanded by fluid pressure.

6. Process as claimed in claim 1, characterised in that the synthetic foam extrudate is diametrically expanded by causing it to travel on a solid expander while the film extrudate is diametrically expanded by fluid pressure.

7. Process as claimed in claim 1, wherein the expansion pressure of the film extrudate and the progress of expansion of the synthetic foam extrudate are mutually adjusted in such a manner that lamination of the extrudates takes place only after each of the extrudate has been expanded independently of the other to at least 90% of their maximum diameter of expansion.

8. Process as claimed in claim 1 in which a bubble form is conferred to the two extrudates by progressive flattening and pinching, this latter being carried out in such a manner as to seal the foam layer on itself, while heat is supplied to the bubble in order to maintain the foam layer in a state sufficiently softened for sealing.

9. Process as claimed in claim 8, in which the heat is supplied by compressed air used for diametrical expansion of the foam extrudate.

10. Process as claimed in claim 8, in which the laminate obtained by pinching and sealing is heated in order to produce an increase in its thickness.

11. Process as claimed in claim 8, in which the laminate is then embossed, corrugated or scored continuously with successive cooling.

References Cited
FOREIGN PATENTS 954,069   2/1961   Great Britain _____ 264—47

MAURICE J. WELSH, Primary Examiner